(12) United States Patent
Russell (10) Patent No.: US 9,769,395 B2
(45) Date of Patent: Sep. 19, 2017

(54) DISPLAY DETECTION FOR AUGMENTED REALITY

(71) Applicant: EMPIRE TECHNOLOGY DEVELOPMENT LLC, Wilmington, DE (US)

(72) Inventor: Jake Armstrong Russell, Bellevue, WA (US)

(73) Assignee: EMPIRE TECHNOLOGY DEVELOPMENT LLC, Wilmington (DE)

( * ) Notice: Subject to any disclaimer, the term of this patent is extended or adjusted under 35 U.S.C. 154(b) by 116 days.

(21) Appl. No.: 14/421,101

(22) PCT Filed: May 2, 2014

(86) PCT No.: PCT/US2014/036561
§ 371 (c)(1),
(2) Date: Feb. 11, 2015

(87) PCT Pub. No.: WO2015/167580
PCT Pub. Date: Nov. 5, 2015

(65) Prior Publication Data
US 2016/0255264 A1    Sep. 1, 2016

(51) Int. Cl.
*H04N 5/235* (2006.01)
*G06F 3/147* (2006.01)
(Continued)

(52) U.S. Cl.
CPC ........... *H04N 5/2357* (2013.01); *G06F 3/147* (2013.01); *G06T 7/0008* (2013.01); *G06T 7/90* (2017.01);
(Continued)

(58) Field of Classification Search
CPC .. H04N 5/2357; H04N 5/2353; H04N 9/3179; G06T 7/408; G06T 11/60; G06T 7/0008; G06T 2207/10004; G06T 2215/16; G06T 2207/10024; G06T 2207/30121; G06F 3/147; G06F 3/005; G09G 2340/0464
See application file for complete search history.

(56) References Cited

U.S. PATENT DOCUMENTS

2004/0190621 A1    9/2004  Del Corso
2006/0158531 A1    7/2006  Yanof
(Continued)

OTHER PUBLICATIONS

"Advanced Television Systems Committee standards," Accessed on http://web.archive.org/web/20140331051035/http://en.wikipedia.org/wiki/Advanced_Television_Systems_Committee_standards, last modified on Jan. 29, 2014, pp. 27.
(Continued)

*Primary Examiner* — Mekonnen Dagnew
(74) *Attorney, Agent, or Firm* — Moritt Hock & Hamroff LLP; Steven S. Rubin, Esq.

(57) ABSTRACT

Technologies are generally described for systems, devices and methods effective to detect a presence of a display. In some examples, a processor may receive image data from a camera. The image data may relate to light incident on the camera. The processor may analyze the image data to determine that the light includes flickering at a frequency. The processor may detect the presence of the display based on the frequency of the flickering.

24 Claims, 6 Drawing Sheets

(51) Int. Cl.
*G06T 7/00* (2017.01)
*G06T 11/60* (2006.01)
*H04N 9/31* (2006.01)
*G06T 7/90* (2017.01)
*G06F 3/00* (2006.01)

(52) U.S. Cl.
CPC ........... *G06T 11/60* (2013.01); *H04N 5/2353* (2013.01); *H04N 9/3179* (2013.01); *G06F 3/005* (2013.01); *G06T 2207/10004* (2013.01); *G06T 2207/10024* (2013.01); *G06T 2207/30121* (2013.01); *G06T 2215/16* (2013.01); *G09G 2340/0464* (2013.01); *G09G 2360/144* (2013.01)

(56) References Cited

U.S. PATENT DOCUMENTS

| | | | |
|---|---|---|---|
| 2007/0052638 | A1 | 3/2007 | May et al. |
| 2009/0226152 | A1* | 9/2009 | Hanes ............... G06F 17/30056 386/248 |
| 2009/0284615 | A1 | 11/2009 | Chen |
| 2011/0234475 | A1 | 9/2011 | Endo |
| 2011/0255786 | A1* | 10/2011 | Hunter .................... H04N 5/21 382/190 |
| 2011/0292241 | A1* | 12/2011 | Segapelli ............. H04N 5/2357 348/226.1 |
| 2012/0212400 | A1 | 8/2012 | Border et al. |
| 2014/0092080 | A1 | 4/2014 | Fukunaga et al. |

OTHER PUBLICATIONS

"Beat (acoustics)," Accessed at http://web.archive.org/web/20140319033136/http://en.wikipedia.org/wiki/Beat_(acoustics), last modified on Mar. 15, 2014, pp. 8.

"Frame rate," Accessed at http://web.archive.org/web/20140422160447/http://en.wikipedia.org/wiki/Frame_rate, last modified on Apr. 14, 2014, pp. 10.

"Instructions for Zero Motion Blur on LightBoost LCD," Accessed at http://web.archive.org/web/20140214033023/http://www.blurbusters.com/zero-motion-blur/lightboost/, published on Jan. 13, 2013, pp. 21.

"NTSC," Accessed at http://web.archive.org/web/20140426032621/http://en.wikipedia.org/wiki/NTSC, last modified on Apr. 19, 2014, pp. 32.

"Shutter Speed vs Frame Rate," Accessed at http://web.archive.org/web/20131110094222/http://www.mediacollege.com/video/camera/shutter/shutter-vs-fps.html, Accessed on Oct. 7, 2014, pp. 2.

Ajanki, A. et al., "An Augmented Reality Interface to Contextual Information," Virtual Reality, Jan. 2011, pp. 161-173, vol. 15.

Ajanki, A., "Inference of relevance for proactive information retrieval," Aalto University, Doctoral Dissertations 128/2013, Oct. 1, 2013, pp. 84.

Baldauf, M. and Frohlich, P., "The Augmented Video Wall: Multiuser AR Interaction With Public Displays," CHI '13 Extended Abstracts on Human Factors in Computing Systems, 2013, pp. 3015-3018.

Bell, B. and Feiner, S., "View management for distributed display environments," In Workshop on Distributed display environments in CHI '05 extended abstracts on Human factors in computing systems, Apr. 2-7, 2005, pp. 2.

Chaplin, R., "Measurement of Flicker Produced by Visual Display Units," IBM, IP.com Disclosure No. IPCOM000059921D, Feb. 1, 1986, pp. 3.

Forte, A. et al., "EyeDecrypt—Private Interactions in Plain Sight," 9th Conference on Security and Cryptography for Networks, 2014, pp. 1-18.

International Search Report and Written Opinion for counterpart International Patent Application No. PCT/US2014/36561 mailed Sep. 25, 2014, 12 pages.

Mann, S. et al., "HDRchitecture: Real-time Stereoscopic HDR Imaging for Extreme Dynamic Range," SIGGRAPH, Aug. 5-9, 2012, p. 1.

Marsh, D., "Temporal Rate Conversion," Accessed at http://web.archive.org/web/20131121171407/http://msdn.microsoft.com/en-us/windows/hardware/gg463407.aspx, updated on Dec. 4, 2001, pp. 11.

"Asus VG278H High Speed LightBoost Video," accessed at https://www.youtube.com/watch?v=hD5gjAs1A2s#t=76, published on Dec. 23, 2012, pp. 4.

"CRT monitor 1000fps Casio Exilim FC-100," accessed at https://www.youtube.com/watch?v=i-SO9XJbkmw, updated on Jan. 28, 2011, pp. 2.

"Plasma TV—What does it look like in slow motion?," accessed at https://www.youtube.com/watch?v=6OvG8pk3k90, published on Jul. 3, 2012, pp. 3.

* cited by examiner

DISPLAY DETECTION FOR AUGMENTED REALITY

CROSS REFERENCE TO RELATED APPLICATION

This Application is a U.S. National Stage filing under 35 U.S.C. §371 of International Application Ser. No. PCT/US14/36561, filed on May 2, 2014. The disclosure of the International Application is hereby incorporated herein by reference in its entirety.

BACKGROUND

Unless otherwise indicated herein, the materials described in this section are not prior art to the claims in this application and are not admitted to be prior art by inclusion in this section.

A wearable device may be in a form of eyeglasses. The wearable device may include one or more augmented reality displays. The augmented reality displays may be positioned near the eyes of a user wearing the wearable device. The augmented reality displays may be configured to be in communication with a processor and may display content to the user. In some examples, each augmented reality display may be further configured to be in communication with additional devices such as a camera.

SUMMARY

In an example, methods effective to detect a presence of a display are generally described. In some examples, a processor may receive image data from a camera. The image data may relate to light incident on the camera. The processor may analyze the image data to determine that the light includes flickering at a frequency. The processor may detect the presence of the display based on the frequency of the flickering.

In an example, devices effective to detect a display are generally described. In some examples, the devices may include a memory, a camera, and a processor. The memory may include instructions. The camera may be effective to receive light incident on the camera and produce image data in response to the light. The processor may be configured to be in communication with the memory and the camera. The processor may be further configured to receive the image data from the camera. The processor may analyze the image data to determine that the light includes flickering at a frequency. The processor may detect the presence of the display based on the determined frequency of the flickering.

In an example, methods for detecting two displays are generally described. The methods may be performed by a processor. In some examples, the methods may include receiving image data from a camera. The image data may relate to light incident on the camera. The methods may include analyzing the image data to determine that the light includes flickering. The methods may include determining a first frequency of flickering in the image data. The methods may include determining a second frequency of flickering in the image data. The second frequency of flickering may be different from the first frequency of flickering. The methods may include detecting the presence of a first display based on the first frequency of the flickering. The methods may include detecting the presence of a second display based on the second frequency of flickering.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to display detection for augmented reality.

Briefly stated, technologies are generally described for systems, devices and methods effective to detect a presence of a display. In some examples, a processor may receive image data from a camera. The image data may relate to light incident on the camera, such as video data captured by a video camera. The processor may analyze the image data to determine that the light includes flickering at a frequency; e.g., an intensity of light, measured in lumens, changing in value in a repeating pattern over time. The processor may detect the presence of the display based on the frequency of the flickering.

As described in more detail below, in an example, a user of an augmented reality (AR) device may view an external video display that may be outputting or displaying a real image within a field of view of the AR device. The AR device may detect and locate the external video display within the field of view. The AR device may then generate and display an AR image on an AR device display which may overlay the external video display in the field of view.

Figure 1:
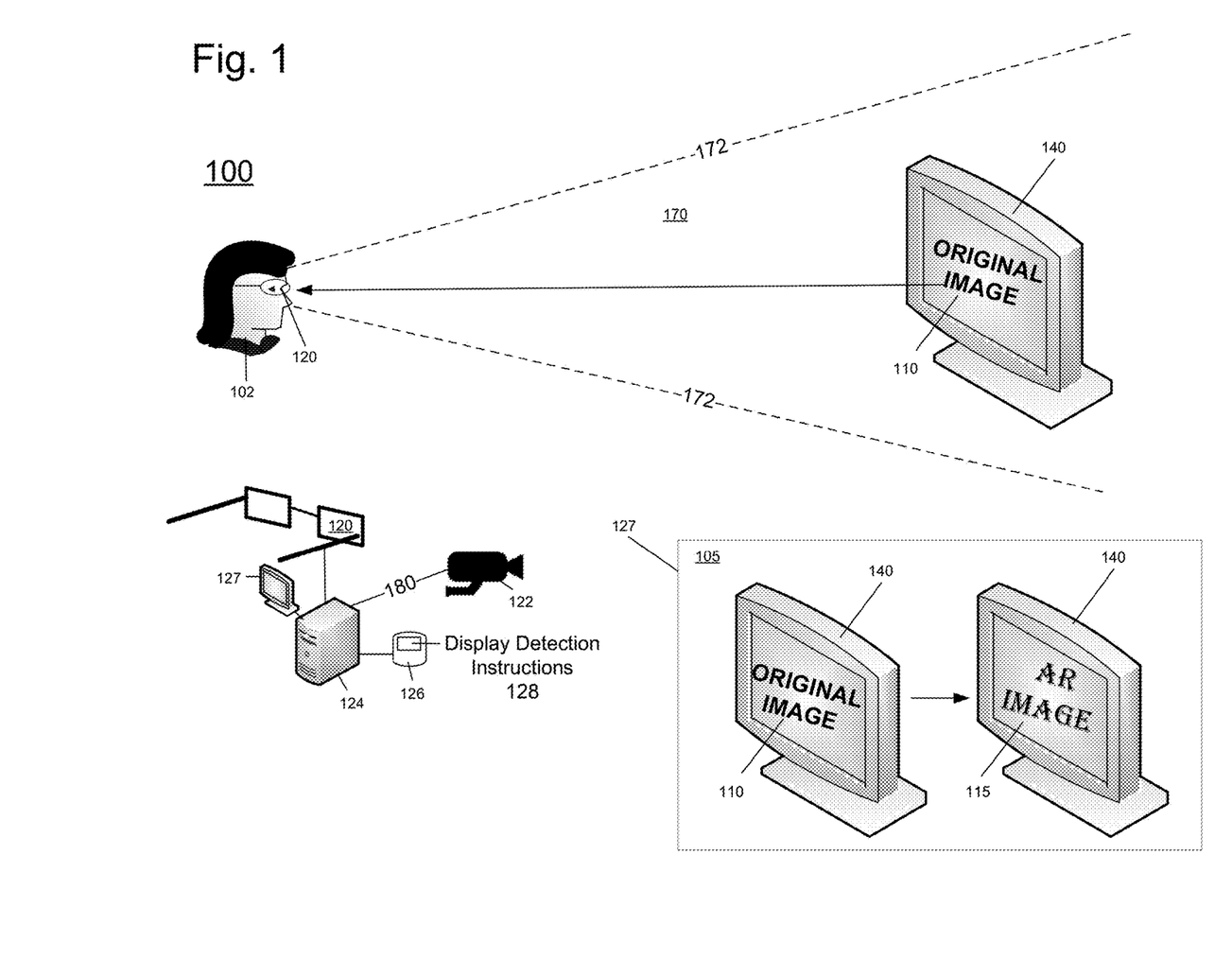
FIG. 1 illustrates an example system effective to implement display detection for augmented reality.

FIG. 1 illustrates an example system 100 effective to implement display detection for augmented reality, arranged in accordance with at least some embodiments described herein. As discussed in more detail below, in some examples, system 100 may include an augmented reality (AR) device 120 that may be used (e.g., worn, carried, etc.) by a user 102. In some examples, AR device 120 may be an augmented reality device like a mobile phone, portable computer, wearable device, smart glasses device such as GOGGLE GLASS, etc.

AR device 120 may include a camera 122, a processor 124, a memory 126, and/or an internal display 127. Processor 124 may be in communication with camera 122, internal display 127 and memory 126. Camera 122 may produce image data 180 in response to incident light incident on camera 122. Internal display 127 may be transmissive (e.g., see-through) or non-transmissive (e.g., opaque), and may include one or more of: a retinal projector; a beam splitter/combiner (which may be referred to as a "prism"); a laser, such as may be found in a digital light processing (DLP) projector; a backlight, such as may be found in a liquid crystal display (LCD); and/or a light modulator or light modulating array, such as an array of liquid crystal modulating elements (as are typically found in an LCD), digital micromirrors (as may be found in a DLP projector), light emitting diodes (as are found in an organic LED or "OLED" display), and/or color filters (such as a Bayer filter or DLP color wheel). The beam splitter/combiner may enable camera 122 to capture light from the same perspective as a retina of user 102. Memory 126 may include display detection instructions 128. As discussed in more detail below, user 102 may desire to use AR device 120 to generate and display an AR image 115 on AR device 120 such that the AR image 115 may overlay over an original image 110 on an external display 140 in a field of view of user 102; as is illustrated by the arrow in FIG. 1. User 102 may then view external display 140 through AR device 120 and see AR image 115 overlaid over original image 110 on external display 140.

In one example, external video display 140 may be in a field of view 170 of camera 122. Field of view 170 may be illustrated as the area bounded by edge 172. Camera 122 may be positioned on AR device 120 such that a field of view of user 102 is essentially equivalent to a field of view of camera 122 so that the field of view of user 102 may also be field of view 170.

Camera 122, with field of view 170, may capture image data 180. Image data 180 may include image data from external display 140 in field of view 170. Camera 122 may capture image data at a frame rate such as 25 frames per second (fps) to 10,000 fps. Camera frame rate may also be expressed as a frame speed in Hertz (Hz), for example, a frame rate of 25 fps or 25 frames of data captured per second may also be expressed as a frame speed of 25 Hz. Although the shutter speed for a film-based camera may typically be the length of time (i.e., the duration) a mechanical door ("shutter") is kept open for exposing the film, the term "shutter speed" may describe a similar phenomenon in a digital camera. For example, the shutter speed for video camera 122 may be the amount of time that a charge-coupled device ("CCD") is allowed to build a charge when capturing each frame of video. The shutter speed of camera 122 may be electronically adjustable, such as by receiving instructions from processor 124. In an example, camera 122 may also capture image data at a shutter speed between $\frac{1}{25}$ second to $\frac{1}{10,000}$ second. A shutter speed of camera 122 may be faster than the period of a flickering cycle in light incident on camera 122 such that camera 122 may capture image data 180 with sufficient temporal detail to permit processor 124 to detect flickering.

Processor 124 may receive image data 180 from camera 122. Image data 180 may relate to light incident on camera 122 from field of view 170. Processor 124, by executing display detection instructions 128, may analyze image data 180. As described in more detail below, processor 124 may detect flickering in some of image data 180. Flickering may occur when an intensity of light, which may be measured in lumens or, alternately, an arbitrary intensity value captured by an image sensor (e.g., an unsigned 8-bit digital sample, where 0 represents the darkest value, and 255 the brightest), changes in value in a repeating pattern over time. In some examples, the change in value may be periodic cycles that may correspond to refresh intervals on an external video display. Processor 124 may detect flickering in image data 180 by analyzing image data 180 and the intensity of pixels of images that could be generated from image data 180. Values of image data 180 may change in a repeating pattern and may correspond to flickering from incident light incident on camera 122. Processor 124 may, by analyzing data values of image data 180, detect flickering. In some examples, processor 124 may utilize a fast Fourier transform (FFT), or another harmonic or time-frequency analysis technique, to analyze data values of image data 180 to detect flickering. In response to detecting flickering in image data 180, processor 124 may determine that external display 140 is located in field of view 170. As shown at 105, processor 124 may send AR image data to internal display 127 to produce AR image 115 that overlays over original image 110.

Figure 2:
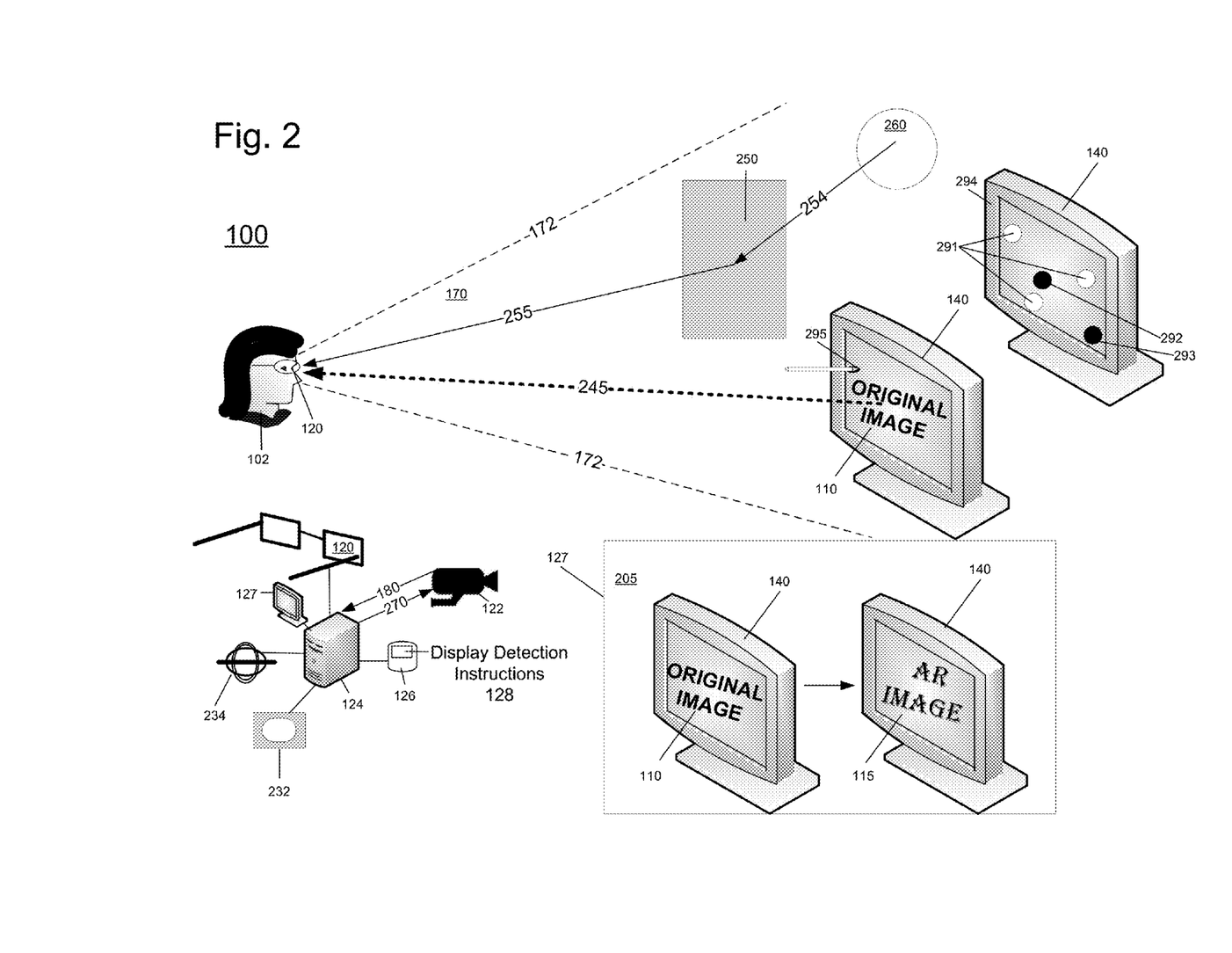
FIG. 2 illustrates the example system of FIG. 1 with additional details relating to determining a location of a detected display.

FIG. 2 illustrates example system 100 of FIG. 1 with additional details relating to determining a location of a detected display, arranged in accordance with at least some embodiments described herein. FIG. 2 is substantially similar to FIG. 1, with additional details. Those components in FIG. 2 that are labeled identically to components of FIG. 1 will not be described again for the purposes of clarity.

System 100 may also include a box 250 and a light source 260 in field of view 170. Light from light source 260 may illuminate box 250. Camera 122, with field of view 170, may capture image data 180. Image data 180 may be data generated by camera 122 in response to light incident on a lens of camera 122. Image data 180 may include image data related to light 245 emanating from external display 140. Image data 180 may also include image data related to light 255 reflected from box 250. Processor 124 may receive image data 180 from camera 122. By executing display detection instructions 128, processor 124 may analyze image data 180. Processor 124 may analyze data values related to pixels of image data 180 or a fraction of pixels in image data 180, such as to conserve battery and/or computing resources. For example, processor 124 may analyze one pixel out of every 4, 16, 64, 256, or 1024 pixels, etc.

Processor may analyze image data 180 to detect flickering. Flickering in image data 180 may be detected by processor 124 by analyzing values of image data 180 corresponding to the intensity of light 245, 255. Data values of image data 180 may correspond to flickering from light incident on camera 122. Upon detection of flickering in data values of image data 180, processor 124 may analyze the flickering to determine the frequency of the flickering. As shown below, processor 124 may determine the frequency of the flickering based on the frame rate and the shutter speed of camera 122.

In one example, image data 180 may be captured by camera 122 at a frame rate of 240 fps and a shutter speed of $\frac{1}{240}$ second. Analysis of image data 180 by processor 124 may determine flickering, in an example, as a cyclical change in pixel values in every fourth frame of captured image data 180. Processor 124 may determine that the frequency of flickering in captured image data 180 is the camera frame rate (240 Hz) divided by the number of frames between intensity peaks or valleys (e.g., troughs) (10) to determine a flickering frequency of 24 Hz.

Processor 124 may determine an intensity peak or valley where the change in intensity value from one frame to the next frame switches direction (e.g., a switch from an intensity increase to an intensity decrease may indicate a peak, and a switch from an intensity decrease to an intensity increase may indicate a valley).

In some examples, processor 124 may require the variation from a determined intensity peak to a subsequently lower value to exceed a threshold in order for the subsequently lower value to be determined as a valley. For example, intensity values in image data 180 may range from 0-255 and a threshold of 10 intensity units difference may be required to determine a new peak or valley. In such an example, an intensity sequence of 140, followed by 146, and then 140 would not result in the recognition of a peak or valley, since the change of 6 intensity units does not exceed the threshold. An intensity sequence of 80, 120, 80 in an example would result in a peak being determined (at 120), since the change of 40 intensity units does exceed the threshold. The application of a threshold value in this manner may prevent higher frequency harmonics of a flickering waveform from causing potentially additional peaks and valleys to be determined. The utilization of the threshold value may help prevent noise, such as may originate in a high-gain analog amplifier in an image sensor of camera 122, from triggering a recognition of false peaks and valleys.

Processor 124 may analyze characteristics of flickering such as an intensity flickering waveform through a full flickering cycle, by calculating and analyzing: a peak duration (e.g., the duration where the intensity is at its peak or maximum value); a valley duration (e.g., the typical duration where the intensity is at its valley or minimum value); a ratio of the peak duration of the non-valley duration to the valley duration (e.g., a duty cycle of the waveform); a rate of increase (e.g., the rate of change in intensity when transitioning from a valley duration to a peak duration); a rate of decay (e.g., the rate of change in intensity when transitioning from a peak duration to a valley duration); a closest shape characterization of the waveform (e.g., whether the waveform has highest mathematical correlation to a sinusoidal, triangular, square, or rectangular waveform), etc. Processor 124 may match a detected or calculated one or more waveform characteristics with characteristics predetermined to likely indicate the presence of a specific one or more types of display. Processor 124 may utilize waveform characteristic matching to more accurately determine whether a display is present, or to determine the likely type of a detected display.

Color Analysis

Processor 124 may analyze image data 180 to detect chromatic flickering. Chromatic flickering may be produced by some types of displays. In an example, if image data 180 includes multiple color luminance channels, processor 124 may convert two or more color channels into a grayscale channel, and may analyze the grayscale channel for flickering. In another example, processor 124 may utilize chromatic flickering detection instead of, or in addition to, the aforementioned grayscale luminous flickering detection technique in order to more reliably detect the presence of certain types of chromatically flickering or chromatically cycling external displays, and/or to more accurately discern between various potential types of external displays. Some displays may refresh their color channels simultaneously. Displays such as plasma televisions may consecutively refresh color channels at unique times, and DLP projectors may project light through a rapidly spinning color wheel, which may only allow one color through at any given time and may produce a strongly detectable chromatic flickering characteristic. Backlights in some displays (such as in some backlit liquid crystal displays) may have detectable chromatic flickering.

Processor 124 may analyze a chrominance channel to detect chromatic flickering. Processor 124 may analyze a chrominance channel similarly to the technique described above for analyzing a luminance channel to detect luminous flickering. For example, processor 124 may analyze samples of the channel for changes that exceed a noise threshold, detect the presence of peaks and/or valleys, and/or otherwise analyze characteristics of the waveform. When multiple luminance channels are present in image data 180, processor 124 may convert the luminance channel to one or more chrominance channels. For example, processor 124 may perform an RGB to YIQ or "YCbCr" format conversion, with the "I", "Q", "Cb", or "Cr" channels being chrominance channels before analyzing the newly converted one or more chrominance channels. In some cases, image data 180 may include one or more chrominance channels directly. In such a case, processor 124 may analyze the one or more chrominance channels for chromatic flickering without conversion.

In some examples, processor 124 may analyze one or more individual color luminance channels for flickering, and may detect the presence of a display when one or more of the individual color channels have substantial luminous flickering. For example, processor 124 may analyze a first color channel (e.g., a red color channel) of image data 180 to determine if a significant intensity flickering characteristic is present. Processor 124 may determine that flickering is present and calculate a frequency of the flickering and/or analyze other waveform characteristic(s). Processor 124 may similarly process one or more additional color channels (e.g., a green and/or a blue color channel). If processor 124 detects flickering in any of the color channels, processor 124 may determine a display may be detected.

Processor 124 may determine that two or more color channels are flickering at the same frequency. Processor 124 may determine a phase difference between the two or more color channels flickering at the same frequency. Processor 124 may determine the phase difference may indicate a display with chromatic flickering. Upon detecting flickering in a first color luminance channel of image data 180, processor 124 may further analyze a second color channel (e.g., a green color channel) of image data 180 to determine if the second color channel also flickers at the same frequency (e.g., 60 Hz—with intensity peaks occurring every 16.6 milliseconds). Processor 124 may calculate a phase difference across the first and the second color channels by calculating the duration from when the first color channel intensity peaks until the second color channel intensity peaks (or vice versa). For example, processor 124 may determine that each red color channel peak occurs approximately 5.5 milliseconds before the next blue color channel peak. In other words, the red color channel's intensity flickering occurs with a phase difference of approximately 120 degrees compared to the blue color channel's intensity flickering. Processor 124 may determine when an "inter-color-channel" phase difference exceeds a threshold (such as to avoid noise-induce errors) and that the phases are substantially different such that chromatic flickering is present. Processor 124 may determine a type of chromatically flickering display is present. Processor 124 may use the calculated phase difference and/or other waveform characteristics to more accurately determine the type of chromatically flickering display. Processor 124 may determine that the display is likely a DLP color wheel when only one color channel is at a non-minimum value at a time (e.g., when the duty cycle of a first color channel does not exceed the phase difference between the first and a second color channel). Processor 124 may determine that the display is not a DLP color wheel when the values of two color channels are non-minimum at the same time. Processor 124 may determine the display is likely a DLP color wheel based display when a square-wave type waveform is detected. Processor 124 may determine the display is a plasma display or cathode ray tube-type display when a logarithmically decaying waveform, which may be indicative of a decaying phosphor, is detected.

For example, image data 180 may relate to light emanating from a plasma TV with different colored phosphors refreshed at different times. Processor 124 may analyze image data 180 and determine a flicker frequency for image data 180 for each different colored phosphor. Processor 124 may determine different phases for each different colored phosphor at the determined frequency.

Cycle Averaging

In order to obtain a more precise frame rate calculation for a given capture frequency, processor 124 may use an average number of frames between peaks or valleys across multiple consecutive flickering cycles. In example, when the capturing frequency and the flickering frequency are not aligned (e.g., when the flickering frequency is not a harmonic of the capturing frequency), the error from the phase misalignment of the samples captured and the waveform features being determined may accumulate across subsequent cycles. In the example, the waveform feature of a future cycle may be determined one sample earlier (or later) than would otherwise be expected based on the preceding data.

For example, processor 124 may determine peaks of the first few cycles of a 24 Hz flickering waveform (captured at a 100 Hz capture frequency) with four sample intervals, resulting in an initial calculation of a 25 Hz flickering frequency. For each subsequent peak determined, there may be a greater likelihood the subsequent peak may be determined by processor 124 one sample earlier than expected (e.g., eventually processor 124 may determine only three sample intervals between subsequent peaks). The more consecutive flickering cycles that are determined by processor 124, the higher the accuracy of the flickering frequency calculation may be. A formula for calculating the maximum error rate of a flickering frequency calculation may be: the maximum error rate of one flickering cycle divided by the number of determined cycles. For example, if only peaks are used to determine the length of a flickering cycle, the error rate for the flickering cycle may be the sample interval (10 ms) divided by the number of cycles determined. For example, if one cycle of a flicker waveform is determined by only two consecutive peaks with a spacing of four samples captured every 0.01 second (e.g., at a 100 Hz capture frequency), the flicker waveform period may be calculated as being 0.04 second with a potential error of less than +/−0.01 second. In other words, the flickering frequency may be most likely a value around 25 Hz (corresponding to a 0.04 second period) and may not be higher than 33.3 Hz (0.03 second period) and not lower than 20 Hz (0.05 second period). By increasing the number of consecutive flicker cycles determined to 25 consecutive flickering cycles being determined by 26 consecutive peaks spanning 100 samples, (or 1.00 second, assuming the same 100 Hz capture frequency) the average flicker period may be calculated to be 0.04 seconds, with a potential error of less than +/−0.0004 second. (0.0396-0.0404 seconds). This may correspond to roughly $25.\overline{25}$ Hz as being $25/100$ a duration time of 1.00 second of intensity peaks being determined. The error of +/−0.01 may be spread across the cycles, changing the accuracy of the flickering frequency calculation to 25/1.00.

As more flickering cycle peaks are determined, the more features of the flickering may be detected (e.g., more peaks and/or valleys may be detected), and the precision of the flickering frequency calculation may be increased. For example, assuming light intensity peaks and valleys can be determined with an accuracy of the nearest determination, then processor 124 may count twenty four light intensity peaks and twenty four light intensity troughs across one hundred samples sequentially captured at a 100 Hz frame rate in image data 180, and calculate a 24.0 Hz flickering frequency with an accuracy of approximately +/−0.48 Hz (time between samples*number of flicker features detected=100 ms*48 peaks and valleys=0.48 Hz). Processor 124 may obtain higher accuracy in flicker frequency calculation by the use of a higher capture frequency. A phase may progressively change from one cycle determination to the next if the flickering frequency is not a subharmonic of the capture frequency. Over enough cycle observations, the cumulative phase change may equal 180 degrees (may result in the measurement of an additional peak or valley) or 360 degrees (may result in the measurement of an additional peak and valley).

Processor 124 may perform a Fourier analysis (e.g., using a FFT) to perform a spectrum analysis of frequencies in a light intensity data sequence of image data 180. Processor 124 may determine a frequency in image data 180, and determine that the strength of the determined frequency exceeds a threshold value (e.g., 3 dB) to determine that flickering may be present in incident light 245, 255. Processor 124 may determine a frequency of the flickering to detect the presence of a flickering external display 140. Processor 124 may determine the presence of external display 140 based on determining a fundamental frequency reflective of a display's refresh frequency, or higher frequency harmonics which may indicate characteristics of a pattern and may indicate a particular type of display.

Beating Frequency Analysis

In other examples, image data 180 may be captured by camera 122 using a shutter speed significantly faster than the frame capturing interval, and camera 122 may support variable frame rates and/or shutter speeds. For example, camera 122 may support operation at a frame rate of 35 Hz or lower, while operating with a fixed shutter speed of $1/100$ second. In such examples, camera 122 may be less expensive than another camera supporting a faster frame rate. A camera 122 using a higher frame rate may necessitate additional bandwidth to transmit the larger amount of image data from camera 122 to processor 124, and the consumption of additional battery power. Analysis of image data 180 by processor 124 may include capturing an initial portion of image data 180 at an initial frame rate, such as 25 Hz, and analyzing image data 180 to determine that a repeating light intensity pattern is present (e.g., by applying one of the aforementioned light intensity peak or valley detection methods, or other pattern analysis methods). For example, processor 124 may receive image data 180 produced by camera 122 with an initial frame rate of 25 Hz and determine that a 5 Hz cycle frequency is present. The frequency detected in the initial portion of image data 180 may be a difference between an actual flicker frequency of light 245 incident on camera 122 and the frame rate used by camera 124 when capturing image data 180. Processor 124 may adjust the frame rate of camera 122 and perform additional analysis on the subsequently received portion of image data 180.

More specifically, processor 124 may perform additional steps to determine whether a detected repeating light intensity frequency in image data 180 is reflective of flickering in light 245 incident on camera 122. Processor 124 may send one or more instructions 270 to camera 122 to adjust a frame rate of camera 122 for subsequently collected image data 180 to 27 Hz. Camera 122 may then collect a subsequent portion of image data 180 with a 27 Hz frame rate. Processor 124 may then analyze the subsequent portion of image data 180 to determine if the 5 Hz cycle frequency determined to be present in the initial portion of image data 180 is reflective of light 245 incident on camera 122.

Processor 124 may use the same technique for calculating a frequency of the second portion of image data 180 as processor 124 used to calculate the frequency of the first portion of image data 180. For example, processor 124 may count a peak and a valley in every nine frames of the second portion of image data 180, and may calculate a 3 Hz frequency for the second portion of image data 180. Processor 124 may then compare the frequency of the initial portion of image data 180 with that of the subsequent portion. Processor 124 may determine the frequency of the initial portion of image data 180 is the same as the frequency of the subsequent portion of image data 180 and determine the calculated frequency is the frequency of light 245 incident on camera 122. Processor 124 may determine the frequency of the initial portion of image data 180 is different from the frequency of the subsequent portion of image data 180 and may determine the difference is due to a higher flicker frequency in image data 180 which may be too high to detect directly with camera 122. Processor 124 may then simultaneously solve the following equations to calculate the flicker frequency of light 245 in image data 180:

$$\text{Flickering frequency of incident light} = |(\text{capture frequency} - \text{image data frequency})|$$

For example, processor 124 may substitute the two examples into the equation:

$$5\ \text{Hz} = |(25\ \text{Hz} - \text{flickering frequency of incident light})|$$

$$3\ \text{Hz} = |(27\ \text{Hz} - \text{flickering frequency of incident light})|$$

Processor 124 may then solve the flickering frequency equations, to arrive at:

$$\text{Flickering frequency of incident light} = 30\ \text{Hz}.$$

Processor 124 may compare detected flickering frequency to display frequencies stored in memory 126. Display frequencies stored in memory 126 may be refresh rate frequencies of standard displays such as about, or plus or minus 0.5 Hz: 23.976 Hz, 24 Hz, 25, Hz, 29.97 Hz, 30 Hz, 50 Hz, 59.94 Hz, and 60 Hz. Upon determining the image data frequency is equivalent to a display frequency stored in memory 126, processor 124 may determine the presence of a display in field of view 170.

Upon determining that a display is present within field of view 170, processor 124 may further analyze image data 180 to determine a location of external display 140. Processor 124 may identify data within image data 180 which corresponds to flickering in light incident on camera 122 at the detected flickering frequency. Image data 180 may also include data which does not change and does not correspond to flickering in light incident on camera 122. For example, image data 180 may include values of pixels related to light 255 reflected from box 250. Box 250 may be illuminated by light source 260 as represented by arrow 254. Light source 260 may be the sun or an artificial light source with a steady lumens output. Image data related to light 255 reflected from box 250 may include data related to pixels with a steady lumens output and so may be determined by processor 124 as data without flickering.

Shape Processing

Processor 124 may perform one or more checks to determine whether a detected flickering area is likely an external display 140. Processor 124 may analyze a shape of the flickering area to determine whether the shape corresponds to a detectable external display 140 shape. Processor 124 may start determining the shape of a flickering area by including pixels which correspond to light flickering at the same frequency. Processor 124 may additionally check the phase of the detected flickering frequency across the flickering area for consistency, such as to determine if the entire area is flickering simultaneously at the same phase (e.g., with all pixels corresponding to light having identical flickering phase, such as to detect an external display 140 that refreshes all pixels at substantially the same time). Processor 124 may calculate the phase of a flickering frequency corresponding to a pixel location by dividing how much time has elapsed at that pixel location since a last detected intensity peak or valley was detected by the period of the determined flickering frequency. In another example, processor 124 may calculate the phase of a flickering frequency corresponding to a pixel location by calculating an FFT complex value, such as one at or nearest to the detected flickering frequency. Processor 124 may determine the phases of the detected flickering frequency of the pixels in the flickering area are uniformly increasing from one side of the flickering area to the opposite side and may detect external display 140 that performs a raster scanning refresh. Processor 124 may calculate a vector representing a phase difference across the flickering area, and may use the direction of the calculated vector to establish a likely top and bottom of a detected external display 140. The vector direction may point from a top to a bottom of a downwardly-refreshing external display 140. Processor 124 may then extend a preliminarily determined flickering area to the convex hull of the preliminarily determined flickering area.

Processor 124 may include some pixels in an extended flickering area even if the corresponding light has no detectable flickering. For example, if one or more non-flickering pixels are substantially dark, and are either surrounded by, or adjacent to, a preliminarily determined flickering area, processor 124 may inwardly and/or outwardly extend the preliminarily determined flickering area to encompass the one or more dark pixels. Processor 124 may determine a dark pixel by determining that its intensity falls below a threshold which may correspond to an external display 140 which is not emitting any light, or which is emitting a minimal amount of light (such as for region it is rending as "black" or dark gray). For example, processor 124 may determine that an unsigned 8-bit pixel intensity may be considered "dark" if it consistently falls below a threshold intensity value, such as 20.

Processor 124 may attempt to extend a preliminarily determined flickering area to approximate the shape of a convex quadrilateral. For example, processor may expand a preliminary determined flickering areas 291 to its convex hull (such as to include internal dark pixels 292). For example, processor 124 may attempt to outwardly expand flickering area 291 and 292 outwardly into dark area 293, but not significantly into non-dark, non-flickering area 294.

In some examples, processor 124 may attempt to extend the preliminarily determined flickering area to include a non-flickering area (or into an area with a substantially different flickering characteristic, such as flickering frequency), such as to still recognize an area behind one or more objects partially occluding the external display. Processor 124 may allow a certain percentage (e.g., up to 20%) of non-dark pixels inside and/or outside of a preliminarily determined flickering area to accommodate an aberration on the surface of the external display itself (such as a specular reflection from light source 260), and/or occluding a portion of the external display (such as a portion 295 of stylus occluding some of the external display 140). Such aberrations may be either non-flickering or differently flickering (e.g., flickering at a different frequency and/or phase).

In some examples, processor 124 may detect rectangular-shaped external displays. Processor 124 may determine the shape of the flickering area is a convex quadrilateral. If the shape of a preliminarily determined flickering area is not a convex quadrilateral, processor 124 may outwardly extend the shape of the flickering area to approximate a convex quadrilateral. If a preliminarily determined flickering area borders on an edge 172 of field of view 170 of camera 122, processor 124 may outwardly extend the preliminarily determined flickering area beyond edge 172, such as to make the flickering area a convex quadrilateral.

Processor 124 may detect one or more specific shapes of detectable external displays 140, such as a flat rectangle having a 16:9 aspect ratio (commonly found in high definition television sets and computer monitors), a 16:10 aspect ratio or a 5:4 aspect ratio (also commonly found in some computer monitors), a 1.43:1 aspect ratio (used in IMAX movie theaters), a 4:3 aspect ratio (commonly found in standard definition television sets), a 1.85:1 aspect ratio (commonly found in widescreen theaters), a 2.59:1 aspect ratio (Cinerama theaters), a 2:40:1 aspect ratio (Blu-ray disc film) or one or more other predetermined aspect ratios or range of aspect ratios for various detectable external displays 140. Processor 124 may perform one or more scaling, rotation, and/or translation operations on the shape of the flickering area, and compare the transformed shape to one or more shapes of detectable external displays 140, to determine if the flickering area shape matches the shape of a detectable external display 140. If there is a shape match, processor 124 may determine that the flickering area may be a detected external display 140 of a type corresponding to the matching detectable external display shape. For example, processor 124 may iteratively perform a variety of scaling, rotation, translation, and/or perspective transformations on the shape of the flickering area to determine a transformed shape matches a rectangle with a 16:9 aspect ratio. Upon the determination that the shape matches a rectangle, processor 124 may determine that the flickering area is a flatscreen 16:9 external display 140. If there is not a transform shape match, processor 124 may determine that the flickering area is not a detectable external display 140.

In another example, processor 124 may utilize a depth sensor (such as an analysis of stereoscopic camera views to extract a depth image) to determine a three dimensional geometry of the flickering area. Processor 124 may analyze the three dimensional geometry to determine if flickering area dimensionally matches the geometry of a detectable external display 140. Three dimension display geometry may include flat surfaces (including rectangular or other shapes of displays), or curved surfaces, (such as a curved display on the surface of a wrist-worn computer, or watch, or a concave-shaped display).

In some examples, processor 124 may update a location of external display 140 by analyzing newly received image data 180 from camera 122, and may use the updated location to more accurately detect and analyze flickering characteristics of the display. For example, processor 124 may determine the location at a first time (such as by using initially received image data 180 corresponding to a first time) and then determine the location at a second time based on subsequently received image data 180 corresponding to a second time. Processor 124 may use spatial data associated with a second time for the determination of a location of external display 140 at the second time. AR device 120 may include an accelerometer 232 and/or a gyroscope 234 in communication with processor 124. Processor 124 may utilize spatial data, for example, from accelerometer 232 and/or gyroscope 234 to determine changes relative between camera 122 and a location of external display 140 based on changes in a location of AR device 120 from a first time to a second time. Processor 124 may also utilize spatial data from accelerometer 232 and/or gyroscope 234 to predict expected changes to an observed size and shape of external display 140 as movement of AR device 120 may change a viewing perspective. Processor 124 may analyze subsequent image data 180 to refine the anticipated location, size and shape of external display 140 anticipated from the spatial data.

Upon determining the size and/or location of external display 140, processor 124 may send AR image data to internal display 127 in AR device 120 to generate and display AR image 115. AR image 115 displayed on AR device 120 may overlay over at least part of original image 110 output on external display 140 when viewed through AR device 120, as depicted at 205. Processor 124 may further analyze image data 180 to identify content output from external display 140. Processor 124 may base AR image 115 on the identified content output from external display 140. AR image 115 may provide pertinent or personal information to user 102.

Figure 3:
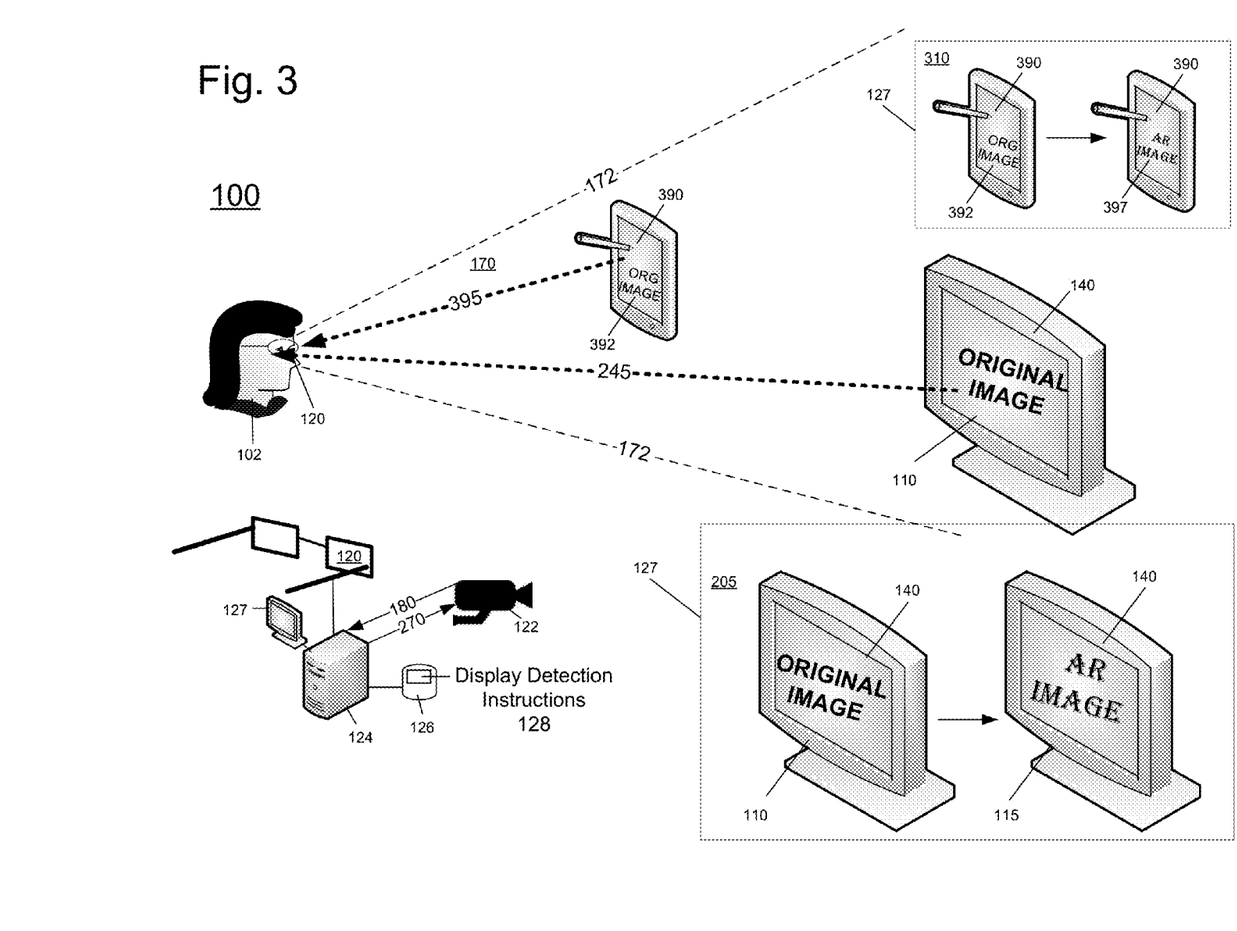
FIG. 3 illustrates the example system of FIG. 1 in an example where two displays are in a field of view.

FIG. 3 illustrates example system 100 in an example where two displays are in a field of view 170, arranged in accordance with at least some embodiments described herein. FIG. 3 is substantially similar to FIGS. 1 and 2, with additional details. Those components in FIG. 3 that are labeled identically to components of FIGS. 1 and 2 will not be described again for the purposes of clarity.

In one example, external video displays 140 and 390 may both be in field of view 170 of user 102 and camera 122. Camera 122 may capture image data 180 that may include image data related to light 245 emanating from first external display 140 and image data related to light 395 emanating from second external display 390. By executing display detection instructions 128, processor 124 may analyze image data 180 including data related to light 245 emanating from first external display 140 and image data related to light 395 emanating from second external display 390.

As discussed above, processor 124 may analyze image data 180 to detect flickering. Processor 124 may, upon detection of flickering, analyze the flickering to determine the frequency of the flickering. Processor 124 may determine the frequency of the flickering detected based on a frame speed and shutter speed of camera 122. Processor 124 may determine two different flickering frequencies in image data 180. Processor 124 may analyze image data 180 to determine data associated with a first frequency of flickering and data associated with a second frequency of flickering. Processor 124 may compare each determined frequency of flickering to frequencies stored in memory 126. Processor 124 may determine that each determined frequency of flickering is equivalent to one or more frequencies in memory 126 that may correspond to refresh rates in displays. Processor 124 may determine the presence of two displays in field of view 170 due to, at least in part, the two determined frequencies of flickering.

Processor 124 may perform one or more checks to determine each flickering area within field of view 170 is an external display. Processor 124 may refine the shapes of the preliminarily determined flickering areas to display shapes, determine display orientation vectors and may perform additional processing on each of the flickering areas.

For example, processor 124, upon determining the presence of two displays within field of view 170, may further analyze image data 180 to locate first external display 140 and second external display 390. Processor 124 may identify data within image data 180 which corresponds to flickering at the frequency of flickering and identify image data related to light 245 emanating from display 140. Processor 124 may identify data within image data 180 which corresponds to flickering at the second frequency of flickering and identify image data related to light 395 emanating from display 390. Image data 180 may also include data related to light which does not change intensity and does not flicker. Processor 124 may determine a size and shape for each of detected external display 140 and detected external display 390 from the identified data.

Upon determining the size and location of first external display 140 and second external display 390, processor 124 may send AR image data to internal display 127 in AR device 120 to generate and display AR images 115 and 397. AR image 115 displayed on AR device 120 may overlay over original image 110 displayed on external display 140 when viewed through AR device 120, as depicted at 205. AR image 397 displayed on AR device 120 may overlay over original image 392 displayed on second external display 390 when viewed through AR device 120, as depicted at 310. AR images 115 and 397 may provide pertinent or personal information to user 102.

In another example, first external display 140 and second external display 390 may emanate light at the same frequency. Processor 124 may determine one flickering frequency in image data 180. Processor 124 may compare the determined flickering frequency to frequencies stored in memory 126. Processor 124 may determine that the determined flickering frequency is equivalent to a frequency in memory 126. Processor 124 may determine the presence of a display in field of view 170 due to the determined flickering frequencies.

Processor 124, upon determining the presence of a display in field of view 170, may further analyze image data 180 to locate first external display 140 and second external display 390. Processor 124 may identify data within image data 180 which correspond to flickering at the determined frequency. Image data related to light 245 emanating from first external display 140 and image data related to light 395 emanating from second external display 390 may be identified by processor 124. Image data 180 may also include data related to light which does not change intensity and does not flicker. Processor 124 may identify data in image data 180 which is not related to flickering. Processor 124 may determine, by the location of identified data with flickering, and data without flickering in image data 180, that there are two display regions within field of view 170.

For example, processor 124 may determine that each flickering area corresponding to an external display are separated by a non-dark, non-flickering area. Processor 124 may determine that each flickering area corresponding to an external display is flickering with a different phase. Processor 124 may determine that there are two distinct convex quadrilateral shapes which each correspond to an external display, even if the two shapes may be touching or overlapping. Processor 124 may determine a size and shape of each determined display region in field of view 170 and may analyze the detected display regions. In one example, processor 124 may determine if the detected display regions are a single display that is partially obscured so as to have separate parts emanate light to camera 122. For example, processor 124 may determine the shape of the display, such as rectangular shape, and then determine that a single display is partially obscured. In another example, processor 124 may determine the determined display regions are not part of a partially obscured display and are two separate displays with the same display frequency. For example, processor 124 may determine the shape of the display, such as a rectangular (or other convex quadrilateral) shape, and then determine that a single display is not partially obscured and that two displays are present. Upon determining the presence of two displays in field of view 170, processor 124 may determine a size and shape for each of detected first external display 140 and detected second external display 390 from the identified data.

Upon determining the size and location of first external display 140 and second external display 390, processor 124 may send AR image data to internal display 127 in AR device 120 to generate and display AR images 115 and 397. AR image 115 displayed on AR device 120 may overlay over original image 110 displayed on first external display 140 when viewed through AR device 120, as depicted at 205. AR image 397 displayed on AR device 120 may overlay over original image 392 displayed on second external display 390 when viewed through AR device 120, as depicted at 310. AR images 115 and 397 may provide pertinent or personal information to user 102.

Among other potential benefits, a system in accordance with the disclosure may allow a user to apply AR images over external displays in an environment. AR images overlaying external displays may provide a user with specific information relevant to the user. For example, a display in an airport may have a listing of flights departing. The AR image may highlight the specific flight for which the user is waiting. In another potential benefit, the AR image may overlay in a "soothing" mode. For example, the AR device may black out or erase content displayed on any display, allowing a user to stay focused on a task, or prevent a user from being annoyed or distracted by unwanted advertisements.

Figure 4:
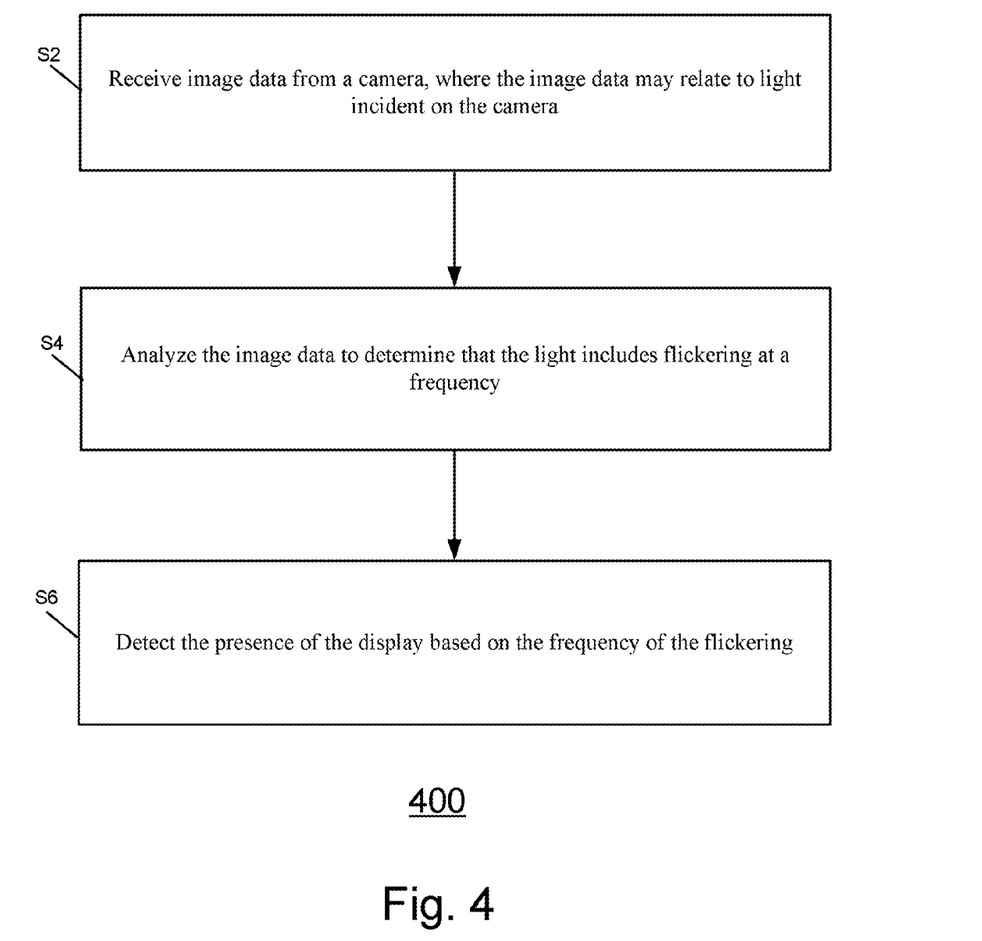
FIG. 4 depicts a flow diagram for example processes for implementing display detection for augmented reality.

FIG. 4 depicts a flow diagram for example processes 400 for implementing display detection for augmented reality, arranged in accordance with at least some embodiments described herein. The process in FIG. 4 could be implemented using, for example, system 100 discussed above. An example method for implementing display detection for augmented reality may include one or more operations, actions, or functions as illustrated by one or more of blocks S2, S4, and/or S6. Although illustrated as discrete blocks, various blocks may be divided into additional blocks, combined into fewer blocks, or eliminated, depending on the desired implementation. Processing may begin at block S2.

At block S2, "Receive image data from a camera, where the image data may relate to light incident on the camera." The processor may receive image data captured by a camera. The camera may generate the image data in response to light incident upon the camera. The camera may capture image data at a frame rate such as 25 frames per second (fps) to 600 fps. The camera may capture image data at a shutter speed between 25 Hz to 1000 Hz. The frame rate and shutter speed of the camera may be similar to a frequency of flickering in light incident on the camera such that the camera may capture image data with sufficient detail to detect flickering.

Processing may continue from block S2 to block S4, "Analyze the image data to determine that the light includes flickering at a frequency." The processor may detect flickering in the image data by analyzing the image data values corresponding to the intensity of light of pixels of an image that could be generated from the image data. Data values of the image data may change in a repeating pattern and correspond to flickering from incident light on the camera. The processor may utilize a Fast Fourier Transform (FFT) to analyze data values of the image data to detect flickering.

Processing may continue from block S4 to block S6, "Detect the presence of the display based on the frequency of the flickering." The processor may detect the presence of a display based on the frequency of the flickering. The processor may analyze the flickering to determine the frequency of the flickering. The processor may determine the frequency of the flickering based on the frame speed and the shutter speed of the camera. The processor may compare detected flickering frequency to display frequencies stored in a memory. Display frequencies stored in the memory may be refresh rate frequencies of displays such as about 24 Hz, 25, Hz, 30 Hz, 50 Hz, or 60 Hz. The processor may determine the image data frequency is equivalent to a display frequency stored in the memory. The processor may determine the presence of a display. The processor may send AR image data to a display in an AR device to produce an AR image. The AR image on the AR device may overlay over original image displayed on the detected display when viewed through the AR device.

Figure 5:
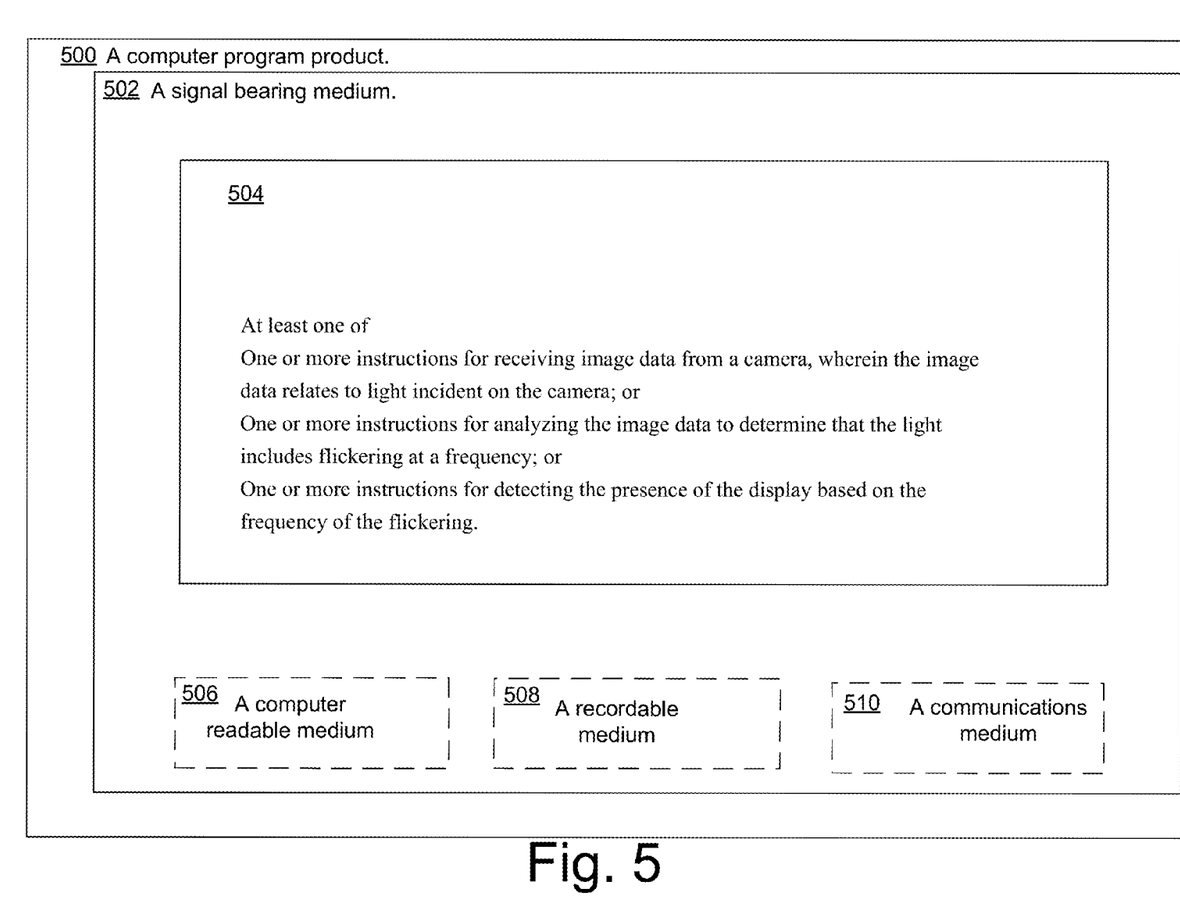
FIG. 5 illustrates computer program products effective to implement display detection for augmented reality.

FIG. 5 illustrates computer program products 500 effective to implement a display detector for augmented reality, arranged in accordance with at least some embodiments described herein. Computer program product 500 may include a signal bearing medium 502. Signal bearing medium 502 may include one or more instructions 504 that, when executed by, for example, a processor, may provide the functionality described above with respect to FIGS. 1-4.

In some implementations, signal bearing medium 502 may encompass a computer-readable medium 506, such as, but not limited to, a hard disk drive (HDD), a Compact Disc (CD), a Digital Versatile Disk (DVD), a digital tape, memory, etc. In some implementations, signal bearing medium 502 may encompass a recordable medium 508, such as, but not limited to, memory, read/write (R/W) CDs, R/W DVDs, etc. In some implementations, signal bearing medium 502 may encompass a communications medium 510, such as, but not limited to, a digital and/or an analog communication medium (e.g., a fiber optic cable, a waveguide, a wired communication link, a wireless communication link, etc.). Thus, for example, computer program product 500 may be conveyed to one or more modules of the system 100 by an RF signal bearing medium 502, where the signal bearing medium 502 is conveyed by a wireless communications medium 510 (e.g., a wireless communications medium conforming with the IEEE 802.11 standard).

Figure 6:
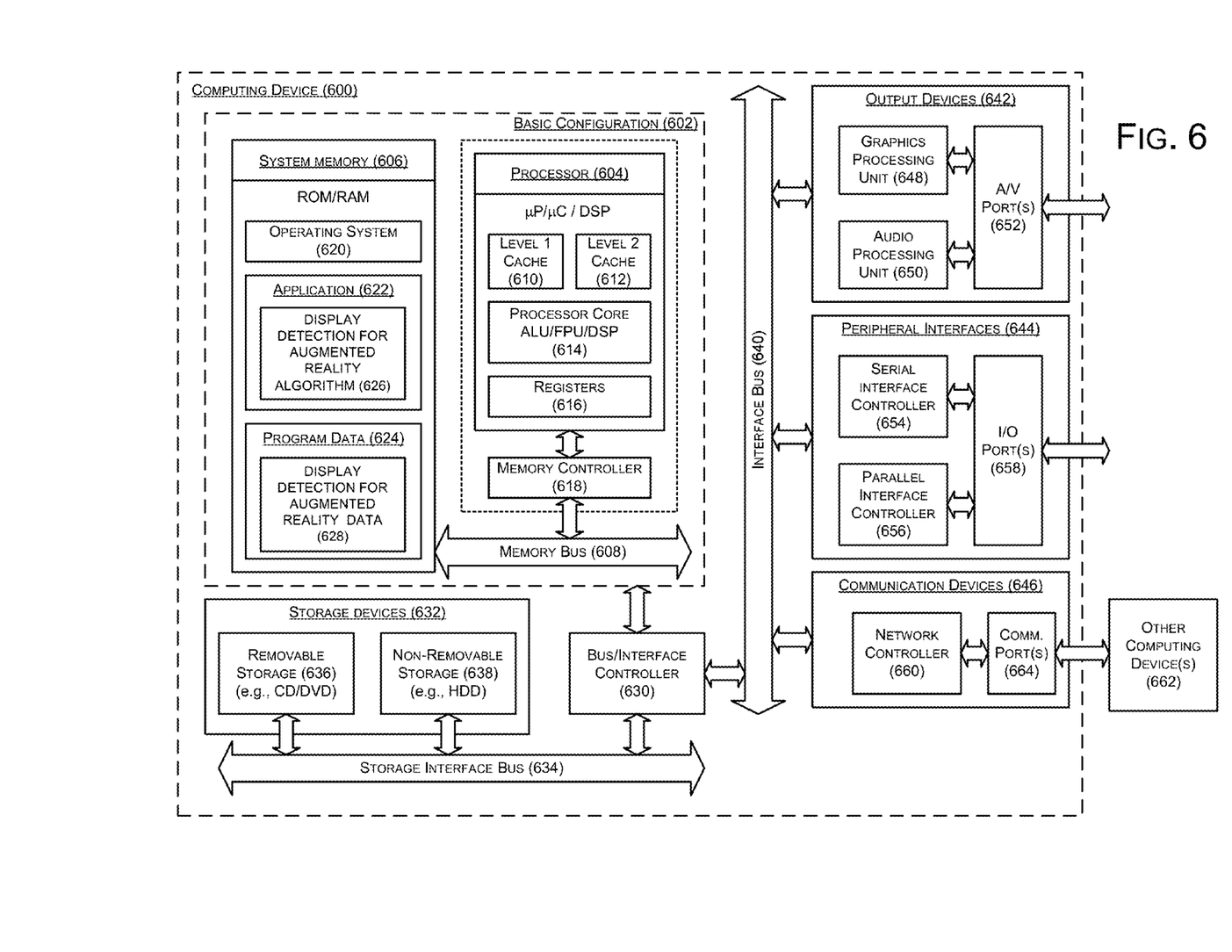
FIG. 6 is a block diagram illustrating an example computing device that is arranged to implement display detection for augmented reality, all arranged in accordance with at least some embodiments described herein.

FIG. 6 is a block diagram illustrating an example computing device 600 that is arranged to implement a display detector for augmented reality, arranged in accordance with at least some embodiments presented herein. In a very basic configuration 602, computing device 600 typically includes one or more processors 604 and a system memory 606. A memory bus 608 may be used for communicating between processor 604 and system memory 606.

Depending on the desired configuration, processor 604 may be of any type including but not limited to a microprocessor (µP), a microcontroller (µC), a digital signal processor (DSP), or any combination thereof. Processor 604 may include one or more levels of caching, such as a level one cache 610 and a level two cache 612, a processor core 614, and registers 616. An example processor core 614 may include an arithmetic logic unit (ALU), a floating point unit (FPU), a digital signal processing core (DSP core), or any combination thereof. An example memory controller 618 may also be used with processor 604, or, in some implementations, memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624.

Application 622 may include a display detection for augmented reality algorithm 626 that is arranged to perform the functions as described herein including those described previously with respect to FIGS. 1-5. Program data 624 may include display detection for augmented reality data 628 that may be useful for display detection for augmented reality as is described herein. In some embodiments, application 622 may be arranged to operate with program data 624 on operating system 620 such that display detection for augmented reality may be provided. This described basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDDs), optical disk drives such as compact disk (CDs) drives or digital versatile disk (DVDs) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than,"

"less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to detect a presence of a display, the method comprising, by a processor:
    receiving image data from a camera, wherein the image data relates to light incident on the camera;
    analyzing the image data to determine that the light includes flickering at a frequency;
    determining a chromaticity of the light;
    determining that the chromaticity changes in value at the frequency;
    determining that the display is chromatically flickering;
    detecting the presence of the display based on the flickering and the frequency at which the light flickers; and
    determining a type of the display based on the determination that the display is chromatically flickering.

2. The method of claim 1, wherein analyzing the image data to determine that the light includes flickering comprises, by the processor:
    determining an intensity of the light; and
    determining that the intensity changes in value at the frequency.

3. The method of claim 1, wherein detecting the presence of the display includes determining that the frequency at which the light flickers is at least one of about 24 Hz, about 25 Hz, about 30 Hz, about 50 Hz, or about 60 Hz.

4. The method of claim 1, wherein:
    analyzing the image data includes analyzing waveform characteristics of the flickering, detecting the presence of the display is based on the analyzed waveform characteristics, and
    determining the type of the display includes determining the type of the display based on the analyzed waveform characteristics.

5. The method of claim 1,
    wherein determining the type of the display includes:
    determining, based on the determination that the display is chromatically flickering, that the display includes a plasma television or a digital light processing (DLP) light projector.

6. The method of claim 1, further comprising:
    varying a capture frequency of the camera so that a first portion of the image data is captured at a first capture frequency, wherein the first capture frequency is higher than a second capture frequency at which a second portion of the image data is captured; and
    determining the frequency at which the light flickers based on an analysis of the first and second portions of the image data and on the first and second capture frequencies.

7. The method of claim 1, further comprising determining a location of the display by:
    identifying first data in the image data which corresponds to the flickering at the frequency;
    identifying second data in the image data which does not correspond to the flickering at the frequency; and
    determining the location of the display based on the identified first and second data.

8. The method of claim 7, wherein determining the location of the display based on the identified first and second data includes determining the location by extrapolating the first data based on a rectangular shape.

9. The method of claim 1, further comprising:
    determining that a contiguous area of the image data which flickers at the frequency, is a convex quadrilateral.

10. The method of claim 1, further comprising determining a first location of the display at a first time by:
    identifying first data in the image data which corresponds to the flickering at the frequency;
    identifying second data in the image data which does not correspond to the flickering at the frequency;
    determining the first location of the display at the first time based on the identified first and second data; and
    determining a second location of the display at a second time by:
        receiving spatial data from an accelerometer and/or a gyroscope; and
        analyzing the spatial data and the first location.

11. The method of claim 1, further comprising, by the processor:
    generating and displaying an augmented reality image on an augmented reality device so that the augmented reality image overlays at least part of the display as viewed through the augmented reality device.

12. The method of claim 11, further comprising, by the processor:
    identifying content output from the display; and
    generating and displaying the augmented reality image based, at least in part, on the identified content so that the augmented reality image overlays at least part of the display.

13. The method of claim 1, wherein the camera has a frame rate of at least 25 frames per second and a shutter speed of less than 1/60 second.

14. A device effective to detect a presence of a display, the device comprising:
    a memory that includes instructions;
    a camera effective to receive light incident on the camera and produce image data in response to the light; and
    a processor configured to be in communication with the memory and the camera, the processor configured to execute the instructions in the memory to:
        obtain the image data from the camera;
        analyze the image data to determine that the light includes flickering at a frequency;
        determine a chromaticity of the light;
        determine that the chromaticity changes in value at the frequency;
        determine that the display is chromatically flickering;
        detect the presence of the display based on the flickering and the frequency at which the light flickers; and
        determine a type of the display based on the determination that the display is chromatically flickering.

15. The device of claim 14, wherein the processor is configured to execute the instructions to determine that the image data includes flickering based on a determination that an intensity of the light changes in value at the frequency.

16. The device of claim 14, wherein to detect the presence of the display, the processor is configured to execute the instructions to detect the presence of the display based on a determination that the frequency at which the light flickers is at least one of about 24 Hz, about 25 Hz, about 30 Hz, about 50 Hz, or about 60 Hz.

17. The device of claim 15, wherein the processor is further configured to execute the instructions to:
   identify first data in the image data which corresponds to the flickering at the frequency;
   identify second data in the image data which does not correspond to the flickering at the frequency; and
   determine a location of the display based on the identified first and second data.

18. The device of claim 17, wherein the processor is configured to execute the instructions to determine the location of the display based on an extrapolation of the first data and based on a rectangular shape.

19. The device of claim 14, wherein the processor is further configured to execute the instructions to:
   identify first data in the image data which corresponds to the flickering at the frequency;
   identify second data in the image data which does not correspond to the flickering at the frequency;
   determine a first location of the display at a first time based on the identified first and second data;
   obtain spatial data from an accelerometer and/or a gyroscope; and
   determine a second location of the display at a second time based on the spatial data and the first location.

20. The device of claim 14, where the processor is further configured to execute the instructions to:
   generate and display an augmented reality image on an augmented reality device so that the augmented reality image overlays at least part of the display as viewed through the augmented reality device.

21. The device of claim 20, wherein the processor is further configured to execute the instructions to:
   identify content output from the display; and
   generate and display the augmented reality image based, at least in part, on the identified content so that the augmented reality image overlays at least part of the display.

22. The device of claim 14, wherein the camera has a frame rate of at least 25 frames per second and a shutter speed of less than 1/60 second.

23. A method to detect a presence of two displays, the method comprising, by a processor:
   receiving image data from a camera, wherein the image data relates to light incident on the camera;
   analyzing the image data to determine that the light includes flickering;
       determining, based on the image data, a first frequency at which the light flickers;
       determining a first chromaticity of the light;
   determining that the first chromaticity of the light changes in value at the first frequency;
   determining that a first display is chromatically flickering;
   determining, based on the image data, a second frequency at which the light flickers, wherein the second frequency at which the light flickers is different from the first frequency at which the light flickers;
   determining a second chromaticity of the light;
   determining that the second chromaticity of the light changes in value at the second frequency;
   determining that a second display is chromatically flickering;
   detecting a presence of the first display based on the flickering included in the light and on the first frequency at which the light flickers;
   detecting a presence of the second display based on the flickering included in the light and on the second frequency at which the light flickers;
   determining a type of the first display based on the determination that the first display is chromatically flickering; and
   determining a type of the second display based on the determination that the second display is chromatically flickering.

24. The method of claim 23, wherein:
   detecting the presence of the first display includes determining that the first frequency at which the light flickers is at least one of about 24 Hz, about 25 Hz, about 30 Hz, about 50 Hz, or about 60 Hz, and
   detecting the presence of the second display includes determining that the second frequency at which the light flickers is at least one of about 24 Hz, about 25 Hz, about 30 Hz, about 50 Hz, or about 60 Hz.

* * * * *

UNITED STATES PATENT AND TRADEMARK OFFICE
CERTIFICATE OF CORRECTION

PATENT NO. : 9,769,395 B2
APPLICATION NO. : 14/421101
DATED : September 19, 2017
INVENTOR(S) : Russell Page 1 of 1

It is certified that error appears in the above-identified patent and that said Letters Patent is hereby corrected as shown below:

In the Claims

Column 20, Lines 10-11, Claim 9, delete "image data" and insert -- image data, --, therefor.

Signed and Sealed this
Twenty-fourth Day of April, 2018

Andrei Iancu
*Director of the United States Patent and Trademark Office*